US009903433B2

(12) United States Patent
Sato et al.

(10) Patent No.: US 9,903,433 B2
(45) Date of Patent: Feb. 27, 2018

(54) ANTI-VIBRATION STRUCTURE

(71) Applicant: BRIDGESTONE CORPORATION, Tokyo (JP)

(72) Inventors: Nobuaki Sato, Tokyo (JP); Masayoshi Kawada, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 14/899,679

(22) PCT Filed: Jun. 24, 2014

(86) PCT No.: PCT/JP2014/066718
§ 371 (c)(1),
(2) Date: Dec. 18, 2015

(87) PCT Pub. No.: WO2015/002032
PCT Pub. Date: Jan. 8, 2015

(65) Prior Publication Data
US 2016/0146283 A1 May 26, 2016

(30) Foreign Application Priority Data
Jul. 3, 2013 (JP) ................................ 2013-139638

(51) Int. Cl.
*F16F 7/00* (2006.01)
*F16F 1/40* (2006.01)
(Continued)

(52) U.S. Cl.
CPC ................ *F16F 1/40* (2013.01); *F16F 15/04* (2013.01); *F16F 15/08* (2013.01)

(58) Field of Classification Search
CPC ........ F16F 1/40; F16F 15/08; F16F 2230/007; F16F 15/04
(Continued)

(56) References Cited

U.S. PATENT DOCUMENTS 5,014,474 A * 5/1991 Fyfe ........................ E04H 9/022 14/73.5
5,339,580 A * 8/1994 Koshika .................... F16F 1/40 248/632
(Continued)

FOREIGN PATENT DOCUMENTS

JP 56-56942 A 10/1979
JP 60-35616 A 2/1985
(Continued)

OTHER PUBLICATIONS

Japanese Notice of Reasons for Rejection for JP 2013-139638 dated Sep. 1, 2015.
(Continued)

*Primary Examiner* — Pamela Rodriguez
(74) *Attorney, Agent, or Firm* — Sughrue Mion, PLLC

(57) ABSTRACT

An anti-vibration structure includes an inner elastic body that is a separate body to a multi-layered material and that is disposed in a through-hole piercing through a layering direction of the multi-layered material, and a restricting member that has at least a portion embedded in the inner elastic body, that has one end coupled to an upper plate and another end coupled to a lower plate and that restricts separation of the upper plate and the lower plate.

13 Claims, 4 Drawing Sheets

10 26 40 17A 20A 20 12 14 50 17 16 32 28 31 30 L 18 17B 34 22 24 W

(51) Int. Cl.
*F16F 15/04* (2006.01)
*F16F 15/08* (2006.01)

(58) Field of Classification Search
USPC ......... 267/141.1, 141.2–141.4, 141.5–141.7, 267/140.11, 140.2–140.4, 152, 293, 294; 52/167.8; 248/634, 636
See application file for complete search history.

(56) References Cited

U.S. PATENT DOCUMENTS

| | | | | |
|---|---|---|---|---|
| 5,676,356 | A * | 10/1997 | Ekonen | B60G 5/053 248/634 |
| 7,201,367 | B2 * | 4/2007 | Wietharn | B60G 11/22 267/141 |
| 8,317,173 | B2 * | 11/2012 | Kawada | F16F 1/40 248/575 |
| 8,864,115 | B2 * | 10/2014 | Kawada | F16F 1/40 267/141 |
| 2010/0007069 | A1 * | 1/2010 | Kawada | F16F 1/406 267/140.3 |
| 2012/0326366 | A1 | 12/2012 | Kawada et al. | |

FOREIGN PATENT DOCUMENTS

| | | | |
|---|---|---|---|
| JP | H01-150041 | A | 6/1989 |
| JP | 9-96005 | A | 4/1997 |
| JP | 9-235703 | A | 9/1997 |
| JP | 2000274483 | A | 10/2000 |
| JP | 2001-64925 | A | 3/2001 |
| JP | 2007309451 | A | 11/2007 |
| JP | 2011-185308 | A | 9/2011 |
| JP | 2013167306 | A | 8/2013 |
| WO | 199720705 | A1 | 6/1997 |

OTHER PUBLICATIONS

International Search Report for PCT/JP2014/066718 dated Jul. 22, 2014.

* cited by examiner

ANTI-VIBRATION STRUCTURE

CROSS REFERENCE TO RELATED APPLICATIONS

This application is a National Stage of International Application No. PCT/JP2014/066718 filed Jun. 24, 2014, claiming priority based on Japanese Patent Application No. 2013-139638 filed Jul. 3, 2013, the contents of all of which are incorporated herein by reference in their entirety.

TECHNICAL FIELD

The present invention relates to an anti-vibration structure that includes a multi-layered material in which plural hard plates and plural soft plates with viscoelastic properties are layered alternately to each other, that supports a vibration generating section such as an engine or a motor on a vibration receiving section such as a vehicle body, and that is employed to prevent vibration, and to dampen and absorb vibrations transmitted to the vibration receiving section from the vibration generating section.

BACKGROUND ART

Conventional anti-vibration structures have been proposed in which a vibration generation section is supported on a vibration receiving section by an anti-vibration structure employing a multi-layered material in which rigid hard plates such as steel plates, and soft plates with viscoelastic properties such as rubber are layered alternately to each other. In such anti-vibration structures, supporting rigidity is increased by the hard plates, and vibration generated by the vibration generating section is prevented, dampened, and absorbed by the soft plates undergoing elastic deformation.

Patent Document 1, for example, describes an elastic element serving as an anti-vibration structure that includes the multi-layered material described above. In patent Document 1, plural metal rings are layered and embedded parallel to each other in a rubber body, and both ends of the circular tube shaped rubber body are sandwiched between end plates. The end plates are coupled together at the center of the rubber body by a chain link embedded in the rubber body.

When vibration is input to the elastic element from random directions, the end plates of the elastic element undergo elastic deformation so as to tilt, such that so-called twisting deformation occurs. In such cases, at the side at which both the end plates move away from each other due to the tilting of the end plates, internal stress is concentrated at portions of the rubber body sandwiched at the inner circumferential side of the metal rings, and the durability of the rubber body is reduced.

RELATED DOCUMENTS

Related Patent Documents

Patent Document 1: Japanese Patent Application Laid-Open (JP-A) No. S60-35616

SUMMARY OF INVENTION

Technical Problem

An object of the present invention is to provide an anti-vibration structure that alleviates a concentration of internal stress at a radial direction center portion of a multi-layered material due to twisting deformation.

Solution to Problem

An anti-vibration structure according to a first aspect of the present invention includes: a multi-layered material in which plural rigid hard plates and plural soft plates with viscoelastic properties are layered alternately to each other; an upper plate and a lower plate that are respectively layered at each layering direction side of the multi-layered material; an inner elastic body that is a separate body from the multi-layered material and that is disposed in a through-hole piercing through the multi-layered material in the layering direction; and a restricting member that has at least a portion embedded in the inner elastic body, that has one end coupled to the upper plate and another end coupled to the lower plate, and that restricts separation of the upper plate and the lower plate.

In the anti-vibration structure according to the first aspect of the present invention, when vibration has been input, the vibration is prevented and dampened by viscoelastic deformation of the plural layers of the soft plates that configure the multi-layered material. In the first aspect of the present invention, the multi-layered material and the inner elastic body are separate bodies to each other, such that the soft plates of the multi-layered material adjacent to the through-hole have an increased free surface area, and can undergo elastic deformation separately to the inner elastic body. Thus, when the multi-layered material has undergone twisting deformation, internal stress can be alleviated from concentrating at a radial direction center portion of the multi-layered material. Furthermore, since the restricting member bends due to input of vibration, even if cracks occurs the inner elastic body, the cracks can be prevented from progressing toward the soft plates.

Moreover, the inner elastic body is disposed in the through-hole, such that the soft plates are suppressed from deforming so as to project out inside the through-hole during compression of the multi-layered material, enabling the supporting rigidity of the anti-vibration structure to be improved.

In an anti-vibration structure according to a second aspect of the present invention, the multi-layered material may be pre-compressed by the restricting member.

Pre-compressing the multi-layered material in this manner enables an earlier rise in the compression springiness of the anti-vibration structure when input with vibration.

In an anti-vibration structure according to a third aspect of the present invention, the inner elastic body may be pre-compressed by the restricting member.

Pre-compressing the inner elastic body in this manner enables an earlier rise in the compression springiness of the anti-vibration structure when input with vibration.

In an anti-vibration structure according to a fourth aspect of the present invention, an outer circumferential face of the inner elastic body and an inner circumferential face of the multi-layered material may abut each other without a gap due to the pre-compression.

Abutting the outer circumferential face of the inner elastic body and the inner circumferential face of the multi-layered material together by press-compression such that there are no gaps therebetween enables an earlier rise in the compression springiness of the anti-vibration structure when input with vibration.

In an anti-vibration structure according to a fifth aspect of the present invention, at least one of the through-hole or the inner elastic body may have a tapered shape in which one end side in the layering direction has a smaller diameter.

The above configuration facilitates insertion of the inner elastic body into the through-hole, and enables ease of assembly to be improved.

Advantageous Effects of Invention

As explained above, the anti-vibration structure of the present invention enables a concentration of internal stress at the radial direction center portion of the multi-layered material that has undergone twisting deformation to be alleviated.

DESCRIPTION OF EMBODIMENTS

Figure 1:
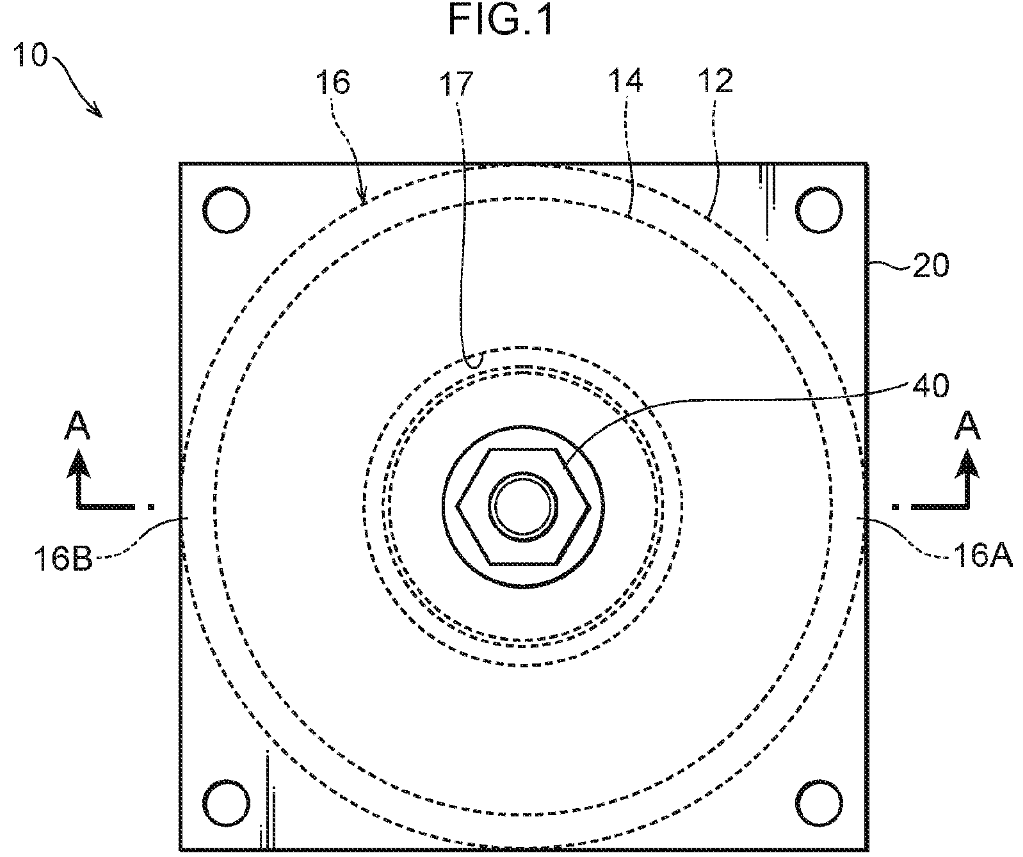
FIG. 1 is an upper view of an anti-vibration structure according to an exemplary embodiment.
Figure 2:
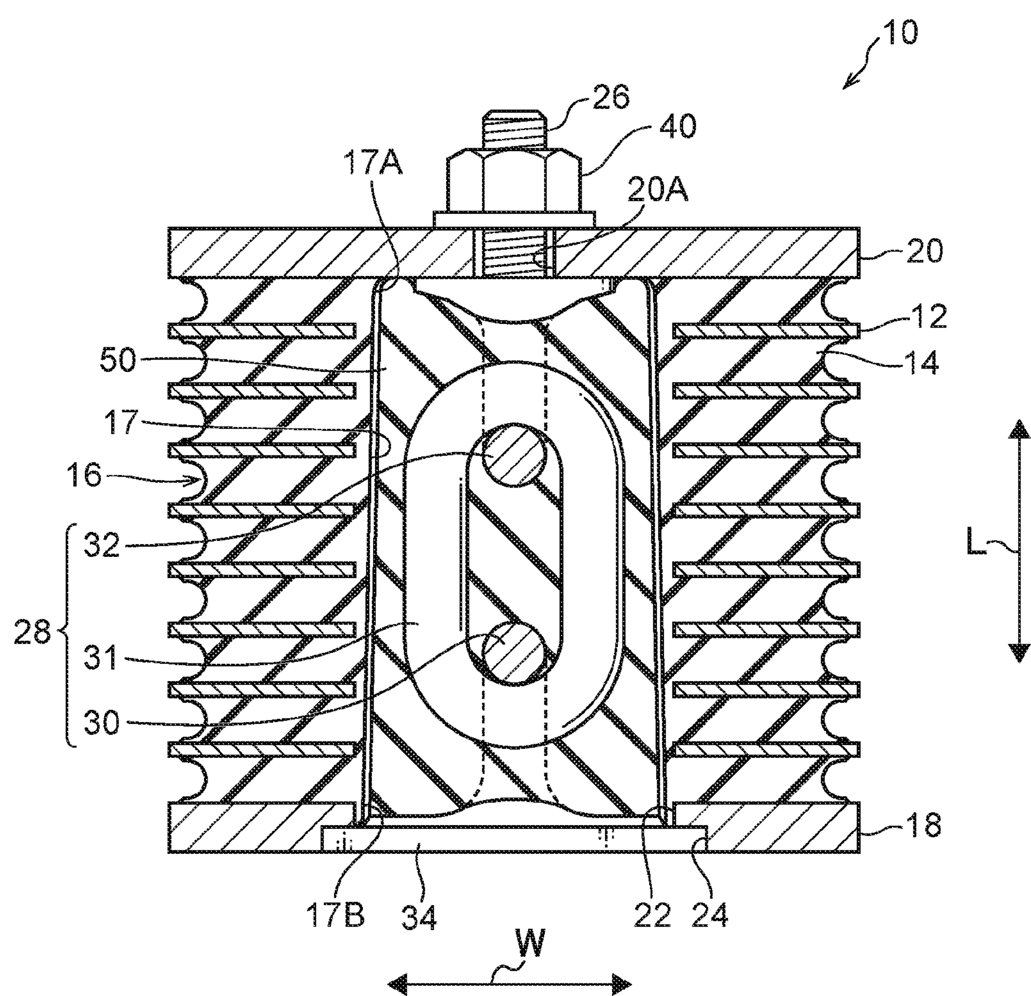
FIG. 2 is a cross-section along line A-A in FIG. 1 of an anti-vibration structure according to the present exemplary embodiment.
Figure 3:
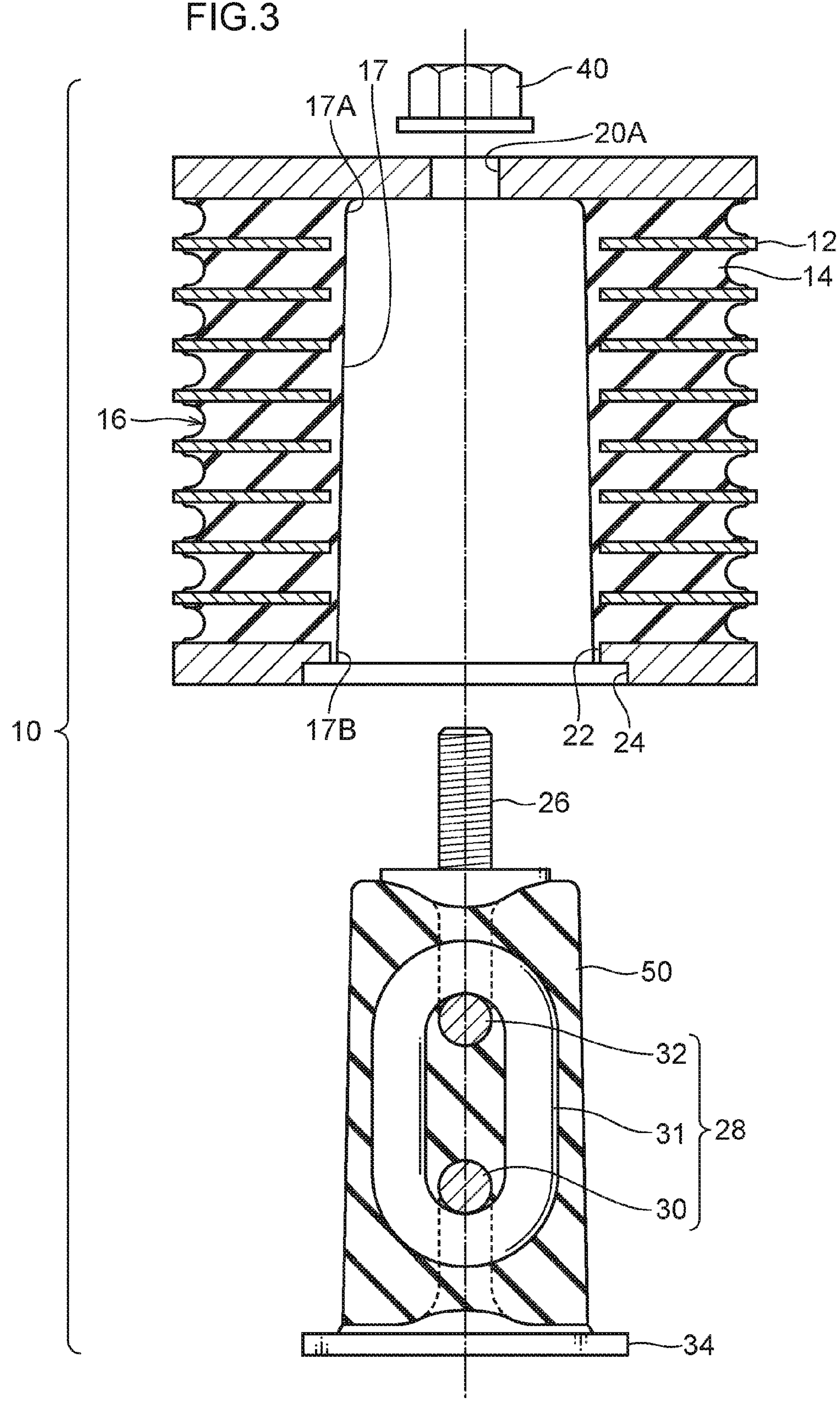
FIG. 3 is an exploded cross-section of FIG. 2.

Explanation follows regarding an anti-vibration structure according to an exemplary embodiment of the present invention, with reference to the drawings.

FIG. 1 to FIG. 4 illustrate an anti-vibration structure according to an exemplary embodiment of the present invention. An anti-vibration structure 10 includes a layered rubber 16 serving as a multi-layered material in which hard plates 12 that are effectively considered to be rigid bodies, and rubber plates 14 that have viscoelastic properties, are layered alternately. The hard plates 12 and the rubber plates 14 are each formed in an annular shape. The layered rubber 16 is formed in a thick, substantially circular tube shape, and a substantially circular column shaped through-hole 17 that pierces through a layering direction of the layered rubber 16 (the arrow L direction) is bored through between center portions of the faces of the layered rubber 16. The through-hole 17 is formed in a tapered shape, in which one end side 17A (an upper plate 20 side, described later) has a slightly smaller diameter than another end side 17B (a lower plate 18 side, described later). The layered rubber 16 is configured by adhering the hard plates 12 and the rubber plates 14 together by vulcanization bonding. A direction orthogonal to the layering direction L forms a shear direction W along which the rubber plates 14 undergo shear deformation. The anti-vibration structure 10 is coupled to a vehicle such that the shear direction W corresponds to the front-rear, or the left-right direction of the vehicle.

Note that metal, ceramic, plastic, FRP, polyurethane, wood, paper sheet, slate sheet, decorative sheet, or the like may be employed as a material for the hard plates 12 that configure the layered rubber 16. The rubber plates 14 are generally molded in a mold, using various types of vulcanized rubber as material therefor. Examples of the rubber include ethylene-propylene rubber (EPR, EPDM), nitrile rubber (NBR), butyl rubber, halogenated butyl rubber, chloroprene rubber (CR), natural rubber (NR), isoprene rubber (IR), styrene-butadiene rubber (SBR), or butadiene rubber (BR).

In the anti-vibration structure 10, the lower plate 18 and the upper plate 20 are respectively layered at the layering direction outsides of the layered rubber 16. The upper plate 20 and the lower plate 18 are respectively fixed to a lower end face and an upper end face of the layered rubber 16 by vulcanization, and sandwich the layered rubber 16 in the layering direction. The lower plate 18 and the upper plate 20 are each configured by a rectangular shaped metal plate. A circular shaped opening portion 22 that faces the through-hole 17 of the layered rubber 16 is formed in a center portion of the lower plate 18, and a recessed shaped insertion-fitting portion 24 is formed to the center of a lower face of the lower plate 18, around a circumferential edge portion of the opening portion 22. A bolt hole 20A, through which a bolt shaft 26, described later, is inserted, is formed in a center portion of the upper plate 20.

An inner elastic body 50 and a metal link chain 28, serving as a restricting member, are provided inside the through-hole 17 of the layered rubber 16 in the anti-vibration structure 10. The inner elastic body 50 is configured as a separate body to the layered rubber 16, is formed in a substantially circular column shape with an outer circumferential face running alongside the through-hole 17, and has a tapered shape in which the upper plate 20 side has a slightly smaller diameter than the lower plate 18 side. The inner elastic body 50 may be configured by an elastic rubber or resin.

Disposing the inner elastic body 50 in the through-hole 17 in this manner enables the compression supporting rigidity of the anti-vibration structure 10 to be increased, compared to cases in which only the link chain 28 is disposed in a hollow through-hole 17. This enables the thickness of the rubber plates 14 to be increased (a distance between the respective hard plates 12 to be lengthened) while securing a specific compression supporting rigidity in the anti-vibration structure 10. Increasing the thickness of the rubber plates 14 in this manner enables the free surface area that is not restrained to be further expanded at an inner circumferential portion of the rubber plates 14 near to the through-hole 17, and at an outer circumferential portion of the rubber plates 14.

Note that setting the rubber hardness of the inner elastic body 50 harder than the rubber hardness of the rubber plates 14 enables the compression supporting rigidity of the anti-vibration structure 10 itself to be further increased, and enables the thickness of the rubber plates 14 to be further increased while securing a specific compression supporting rigidity.

The link chain 28 is embedded inside the inner elastic body 50, and the length direction thereof is disposed so as to be aligned with the layering direction of the layered rubber 16. A whole portion of the link chain 28 may be embedded inside the inner elastic body 50, or a portion of the link chain 28 may be embedded inside the inner elastic body 50. The link chain 28 is configured by plural (three in the present exemplary embodiment) annular shaped link pieces (a lower link piece 30, a center link 31, and an upper link piece 32) that are coupled together in a linear shape. The upper link piece 32 is disposed at the upper plate 20 side, and includes the bolt shaft 26 projecting out from the inner elastic body 50 toward the upper side. The lower link piece 30 is disposed at the lower plate 18 side, and a circular plate shaped lower cap member 34 that configures a portion of the lower plate 18 is formed at a lower end portion thereof. The lower link piece 30 and the lower cap member 34 are integrally formed by forging or the like. The center link 31 is disposed between the lower link piece 30 and the upper link piece 32, and couples together the lower link piece 30 and the upper link piece 32.

The inner elastic body 50 embedded with the link chain 28 is inserted into the through-hole 17 from the lower plate 18 side, the bolt shaft 26 is inserted into the bolt hole 20A of the upper plate 20, and is fixed from outside the upper plate 20 by a nut 40. The lower cap member 34 closes the opening portion 22 of the lower plate 18, and an outer circumferential edge portion of the lower cap member 34 is insertion-fitted into the insertion-fitting portion 24 of the lower plate 18. The lower plate 18 and the upper plate 20 are coupled together, and a distance between the lower plate 18 and the upper plate 20 is restricted from increasing, by the link chain 28. The inner elastic body 50 and the link chain 28 are easily capable of deforming in the shear direction W that is orthogonal to the layering direction, due to elastic deformation of the inner elastic body 50, and due to the link chain 28 bending at respective coupling portions between the lower link piece 30, the center link 31, and the upper link piece 32.

The layered rubber 16 and the inner elastic body 50 are compressed along the layering direction L at a specific compression ratio, and abut the lower cap member 34 and the upper plate 20. When this is performed, the length is set such that the link chain 28 is in a stretched state (a tensed state), and a pre-compressed state is maintained in which the layered rubber 16 is compressed at the specific compression ratio. This pre-compression enables a large compression supporting rigidity to be secured in the layered rubber 16. It is preferable that this pre-compression fills between the outer circumferential face of the inner elastic body 50 and an inner circumferential face of the layered rubber 16 such that there are no gaps therebetween. In a state in which, due to being pre-compressed, the outer circumferential face of the inner elastic body 50 and the inner circumferential face of the layered rubber 16 abut each other without any gaps therebetween, during input of compression force, the inner circumferential face of the layered rubber 16 can be prevented from bulging out toward the shear direction inside, and the outer circumferential face of the inner elastic body 50 can be prevented from bulging out toward the shear direction outside. This accordingly enables an earlier rise in the compression springiness of the anti-vibration structure 10 when input with vibration.

Explanation follows regarding effects of the anti-vibration structure of the present exemplary embodiment.

The anti-vibration structure 10 according to the present exemplary embodiment is provided, for example, so as to be interposed between a vibration generating section such as an engine or a motor, and a vibration receiving section such as a floor or a vehicle body, and supports the vibration generating section on the vibration receiving section. When this is performed, the layered rubber 16 is coupled to the vibration generating section such that the shear direction W is along the vibration direction of the floor, the vehicle body, or the like. For example, coupling to the vehicle body is performed such that the shear direction W corresponds to the front-rear direction of the vehicle.

Figure 4:
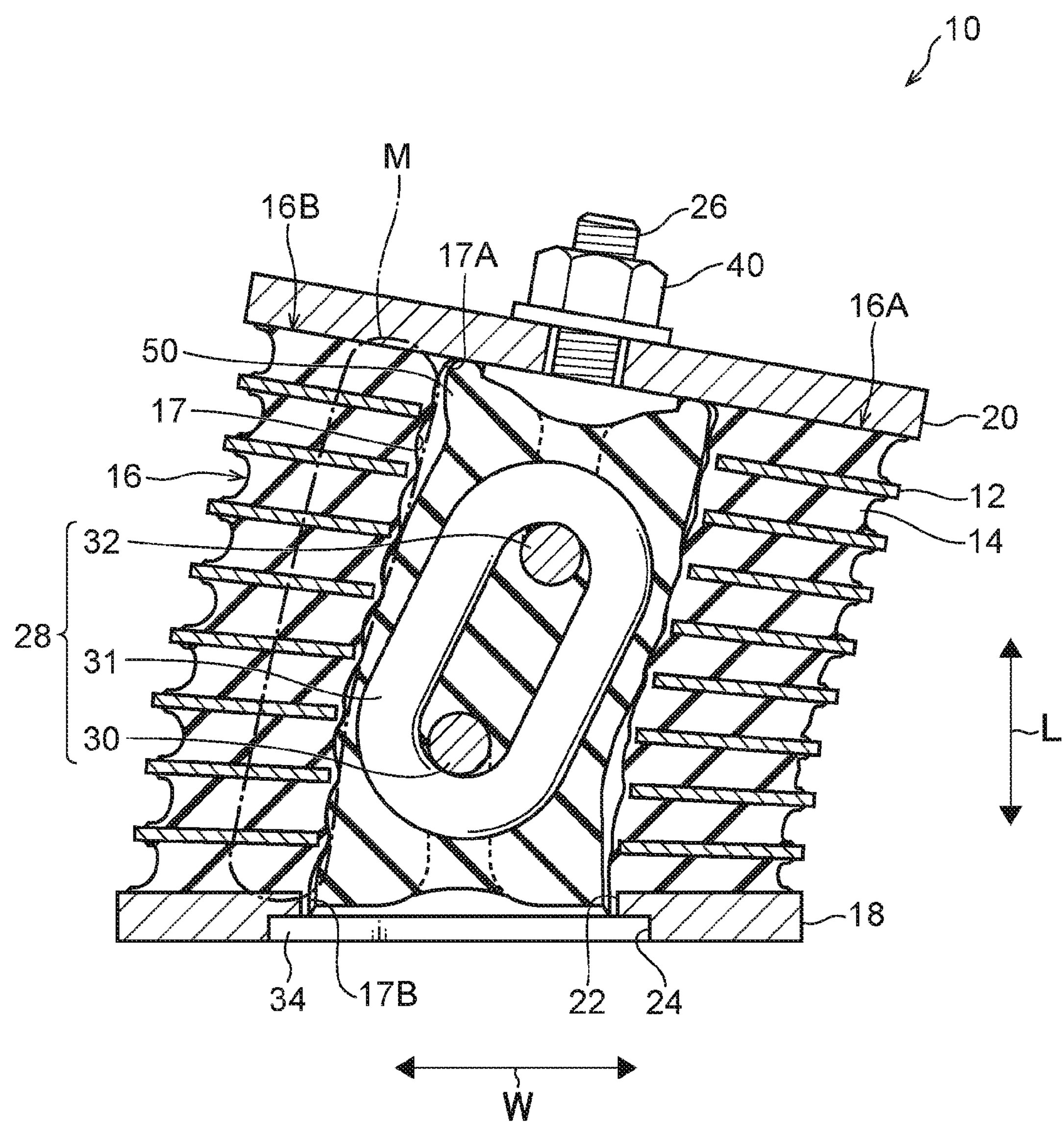
FIG. 4 is a cross-section illustrating a state in which an anti-vibration structure according to the present exemplary embodiment has undergone twisting deformation.

When vibration is generated by the vibration generating section, the vibration is dampened and absorbed due to the layered rubber 16 mainly deforming in the shear direction W, and due to inner friction and the like. As illustrated in FIG. 4, in cases in which the layered rubber 16 undergoes twisting deformation due to vibration input from random directions, the upper plate 20 and the lower plate 18 are no longer parallel to each other, one side 16A in the radial direction of the layered rubber 16 tilts such that the upper plate 20 and the lower plate 18 approach each other, and another end side 16B at the opposite side thereto tilts such that the upper plate 20 and the lower plate 18 move away from each other. When this occurs, tensile deformation acts on the other end side 16B of the layered rubber 16, and stress is concentrated at a rubber plate inner portion M. However, the rubber plates 14 that are sandwiched between the hard plates 12 are separate bodies to the inner elastic body 50, such that the free surface area that is capable of deforming without being restrained increases at the inner circumferential portion. Concentration of internal stress at the one side 16A of the rubber plates 14 is thereby alleviated, enabling the durability of the layered rubber 16 to be improved.

In the present exemplary embodiment, the distance between the lower plate 18 and the upper plate 20 is restricted from increasing by the link chain 28, thereby enabling tensile stress occurring along the layering direction L in the layered rubber 16 to be reduced.

Note that in the present exemplary embodiment, the layered rubber 16 is pre-compressed by the link chain 28; however, this pre-compression is not absolutely necessary. A configuration may be applied in which only one out of the layered rubber 16 or the inner elastic body 50 is pre-compressed, or in which neither are pre-compressed. As in the present exemplary embodiment, pre-compressing the layered rubber 16, and filling between the outer circumferential face of the inner elastic body 50 and the inner circumferential face of the layered rubber 16 such that there are no gaps therebetween, enables an earlier rise in the compression springiness of the anti-vibration structure 10 when input with vibration.

In the present exemplary embodiment, the inner elastic body 50 and the through-hole 17 are each formed in a tapered shape in which the upper plate 20 side has a slightly smaller diameter than the lower plate 18 side; however, the tapered shape is not absolutely necessary, and a circular column shape may be employed. There is no need to form both the inner elastic body 50 and the through-hole 17 in tapered shapes, and a configuration may be employed in which only one out of the inner elastic body 50 or the through-hole 17 has a tapered shape. As in the present exemplary embodiment, forming both the inner elastic body 50 and the through-hole 17 in tapered shapes enables easy insertion of the inner elastic body 50 into the through-hole 17. This also enables ease of removal of a mold core, which is disposed in the through-hole 17 when vulcanizing the layered rubber 16, to be improved.

The invention claimed is:

1. An anti-vibration structure comprising:

a multi-layered material in which a plurality of rigid hard plates and a plurality of soft plates with viscoelastic properties are layered alternately to each other;

an upper plate and a lower plate that are respectively layered at each layering direction side of the multi-layered material;

an inner elastic body that is a separate body from the multi-layered material and that is disposed in a through-hole piercing through the multi-layered material in the layering direction; and a restricting member that has at least a portion embedded in the inner elastic body, that has one end coupled to the upper plate and another end coupled to the lower plate, and that restricts separation of the upper plate and the lower plate, wherein the multi-layered material is pre-compressed in the layering direction by the restricting member when the restricting member is in a tensed state.

2. The anti-vibration structure of claim 1, wherein the inner elastic body is pre-compressed by the restricting member.

3. The anti-vibration structure of claim 1, wherein an outer circumferential face of the inner elastic body and an inner circumferential face of the multi-layered material abut each other without a gap due to the pre-compression.

4. The anti-vibration structure of claim 1, wherein at least one of the through-hole or the inner elastic body has a tapered shape in which one end side in the layering direction has a smaller diameter.

5. The anti-vibration structure as claimed in claim 1, wherein an outer circumferential face of the inner elastic body and an inner circumferential face of the multi-layered material abut each other due to the pre-compression.

6. The anti-vibration structure as claimed in claim 1, wherein the restricting member includes annular shaped link pieces of an upper link, a center link, and a lower link, and the entirety of the center link is embedded in the inner elastic body, such that the inside of the annular shape of the center link is filled with the inner elastic body.

7. An anti-vibration structure comprising:

a multi-layered material in which a plurality of rigid hard plates and a plurality of soft plates with viscoelastic properties are layered alternately to each other;

an upper plate and a lower plate that are respectively layered at each layering direction side of the multi-layered material;

an inner elastic body that is a separate body from the multi-layered material and that is disposed in a through-hole piercing through the multi-layered material in the layering direction; and a restricting member that has at least a portion embedded in the inner elastic body, that has one end coupled to the upper plate and another end coupled to the lower plate, and that restricts separation of the upper plate and the lower plate, wherein the inner elastic body is pre-compressed in the layering direction by the restricting member when the restricting member is in a tensed state.

8. A method of using an anti-vibration structure, wherein the anti-vibration structure comprises;

a multi-layered material in which a plurality of rigid hard plates and a plurality of soft plates with viscoelastic properties are layered alternately to each other;

an upper plate and a lower plate that are respectively layered at each layering direction side of the multi-layered material;

an inner elastic body that is a separate body from the multi-layered material and that is disposed in a through-hole piercing through the multi-layered material in the layering direction; and a restricting member that has at least a portion embedded in the inner elastic body, that has one end coupled to the upper plate and another end coupled to the lower plate, and that restricts separation of the upper plate and the lower plate; and wherein the multi-layered material is pre-compressed in the layering direction by the restricting member when the restricting member is in a tensed state at an initial installation of the anti-vibration structure in a vehicle.

9. The method of using the anti-vibration structure of claim 8, wherein the inner elastic body is pre-compressed by the restricting member.

10. The method of using the anti-vibration structure of claim 8, wherein an outer circumferential face of the inner elastic body and an inner circumferential face of the multi-layered material abut each other without a gap due to the pre-compression.

11. The method of using the anti-vibration structure of claim 8, wherein at least one of the through-hole or the inner elastic body has a tapered shape in which one end side in the layering direction has a smaller diameter.

12. The method of using the anti-vibration structure as claimed in claim 8, wherein an outer circumferential face of the inner elastic body and an inner circumferential face of the multi-layered material abut each other due to the pre-compression.

13. The method of using the anti-vibration structure as claimed in claim 8, wherein the restricting member includes annular shaped link pieces of an upper link, a center link, and a lower link, and the entirety of the center link is embedded in the inner elastic body, such that the inside of the annular shape of the center link is filled with the inner elastic body.

* * * * *